US005658101A

United States Patent [19]

Hammer

[11] Patent Number: 5,658,101

[45] Date of Patent: Aug. 19, 1997

[54] MILLING HEAD

[75] Inventor: Helmut Hammer, Aalen, Germany

[73] Assignee: Gebr. Leitz GmbH & Co., Oberkochen, Germany

[21] Appl. No.: 411,789

[22] PCT Filed: Oct. 6, 1993

[86] PCT No.: PCT/EP93/02729

§ 371 Date: May 18, 1995

§ 102(e) Date: May 18, 1995

[87] PCT Pub. No.: WO94/07665

PCT Pub. Date: Apr. 14, 1994

[30] Foreign Application Priority Data

Oct. 7, 1992 [DE] Germany ............................ 9213466 U

[51] Int. Cl.[6] ........................................ B23C 5/24

[52] U.S. Cl. ................................ 407/37; 407/33; 407/40; 407/44

[58] Field of Search ................................ 407/33, 34, 35, 407/36, 37, 40, 41, 42, 43, 44, 45, 49, 108, 22, 47; 144/218, 229, 230, 241

[56] References Cited

U.S. PATENT DOCUMENTS

| | | | |
|---|---|---|---|
| 1,269,378 | 6/1918 | Bunch | 144/230 |
| 2,207,909 | 7/1940 | Besaw | 407/49 X |
| 2,917,097 | 12/1959 | Smith et al. | 144/230 |
| 4,078,868 | 3/1978 | Erkfritz | 407/49 X |
| 4,449,556 | 5/1984 | Colton | 144/230 |
| 4,658,875 | 4/1987 | Grabovac | 144/218 X |
| 5,176,191 | 1/1993 | Owens | 407/41 X |

*Primary Examiner*—M. Rachuba
*Assistant Examiner*—Henry W. H. Tsai
*Attorney, Agent, or Firm*—Wigman, Cohen, Leitner & Myers

[57] ABSTRACT

An improved milling head. A milling head is provided with a backing plate with a toothed system on the from side, whose teeth run in parallel to the longitudinal axis of the carrier body. Because the blade plate has a toothed system, which can be engaged with the toothed system on the front of the support plate, the blade plate no longer needs to be shifted radially outward to be resharpened. Rather the blade plate must only be radially displaced to the outside by a tooth of a micro-toothed system. This simplifies the regrinding on a constant flight circle diameter, because only the hard metal of the blade plate needs to be ground, which can be accomplished with a normal hard metal grinding wheel. The support plate only needs to be shaped when it is manufactured, which is possible with a normal corundum disk and can be accomplished quickly. Since the support plate does not need to be reground, it remains completely functional and can be used together with a new blade plate. In a preferred embodiment, the support plates and the flank of the groove which creates the face of the support plate provide for an interlocking securing device for the support plate against any dislocation in the radial direction relative to the carrier body.

4 Claims, 3 Drawing Sheets

FIG. 1
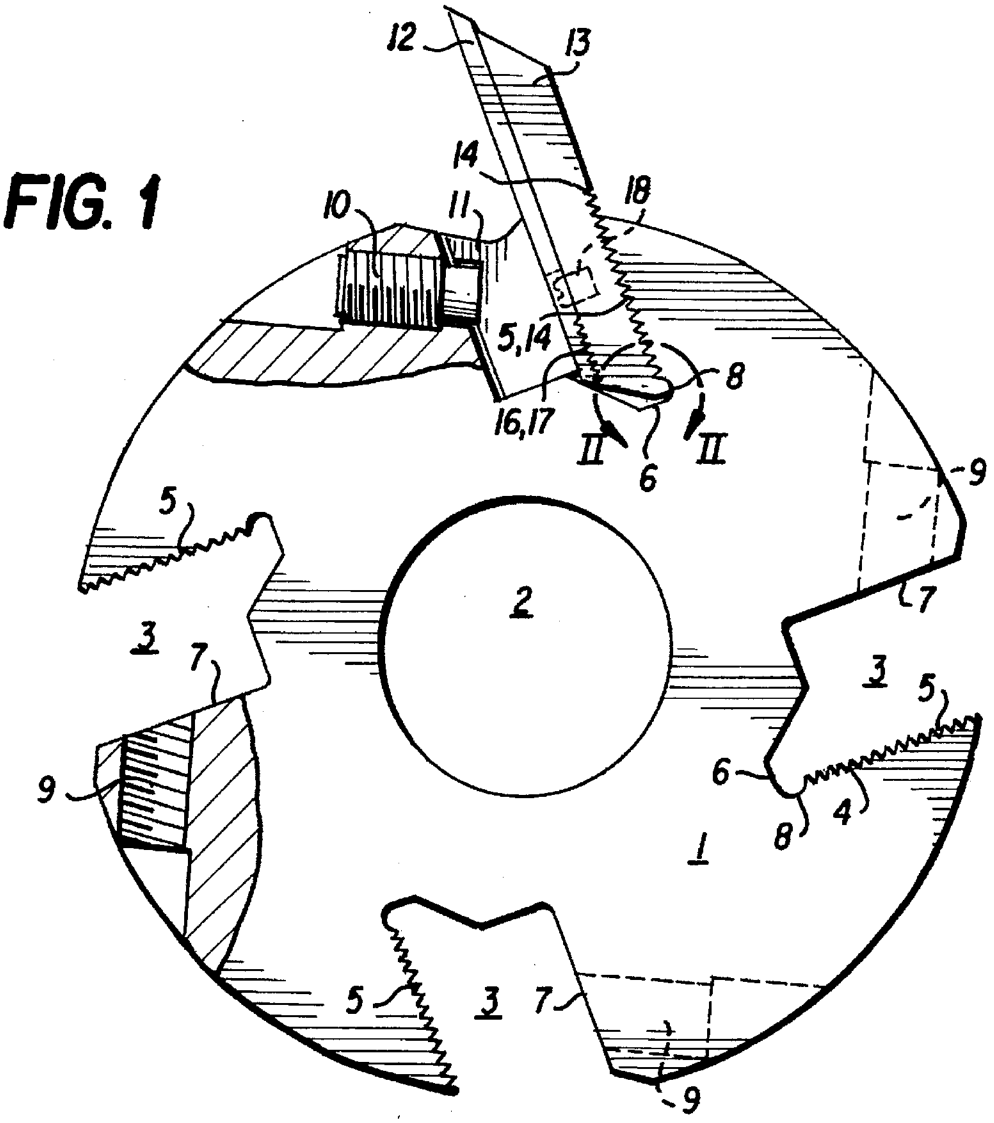
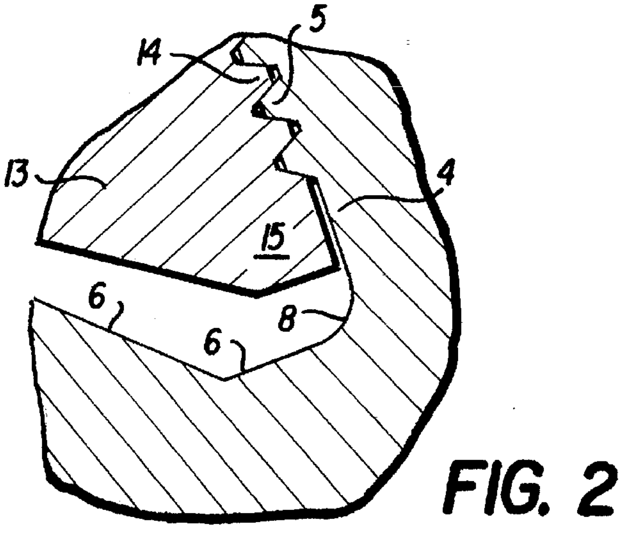
FIG. 2

FIG. 7
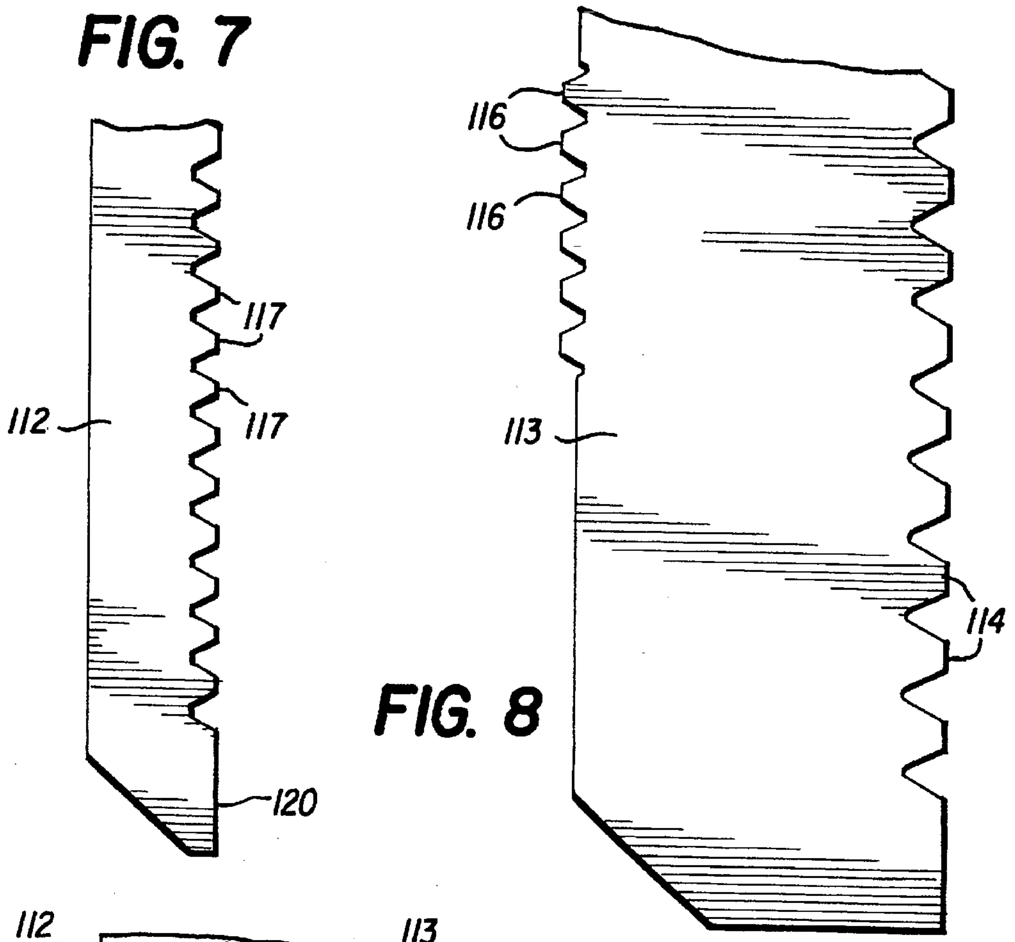
FIG. 8
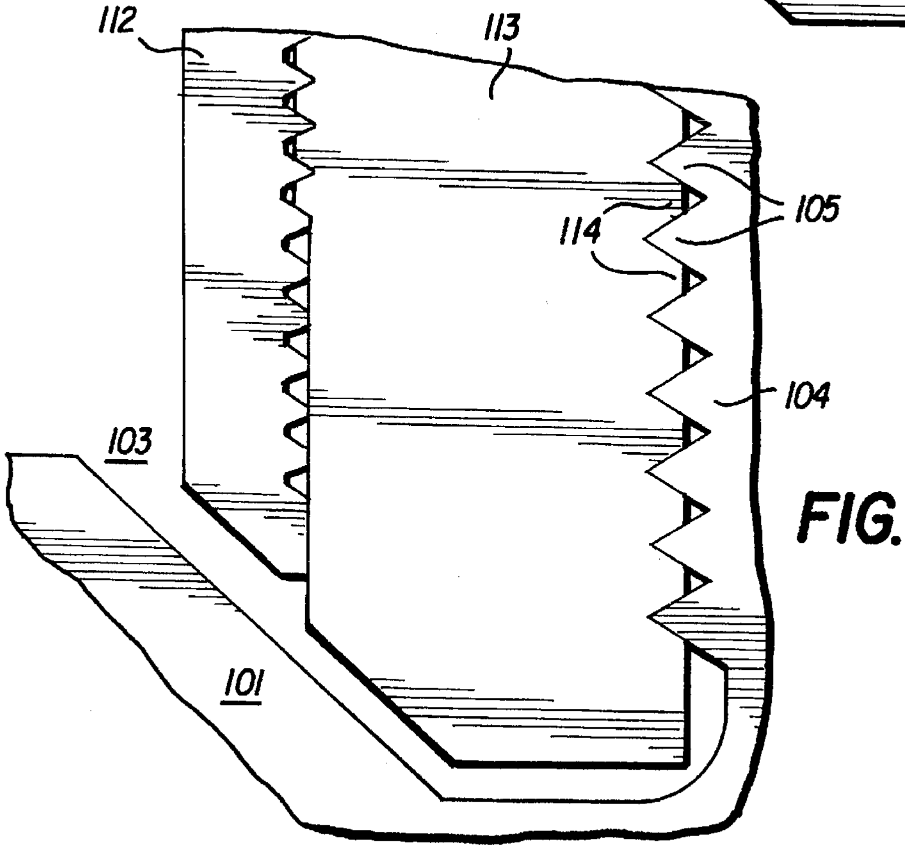
FIG. 9

MILLING HEAD

BACKGROUND OF THE INVENTION

The invention relates to a milling head, which are used preferably for peripheral milling.

Normally milling heads of this kind have soldered blades, that is the blades are supplied with soldered hard metal cutting elements. Such soldered blades have a series of disadvantages. For example, fractures can occur in the hard metal when grinding and reshaping. Furthermore, the grinding and reshaping is costly because combination hard metal grinding wheels are required for this.

A known milling head of the already known type does not have these disadvantages (EP 0 345 570 A1), because the blade plate is not soldered to the support plate, but rather only lies on this. In addition to the frictional force that occurs between the blade plate and the backing plate, because both are pressed together against the groove which accepts the edge by means of the pressure block, the blade plate is protected from a radial shifting relative to the backing plate by a groove running in parallel to the longitudinal axis of the carrier body, into which a ridge-shaped section of the material of the backing plate grips. Namely, the support plate can be adjusted radially to the outside together with blade plate tooth by tooth thanks to the toothed system on the back side of the support plate which engages in a toothed system in the edge of the groove, to achieve the original flight circle diameter again when resharpening. When resharpening, the backing plate must be correspondingly ground so that, when the blade plate can no longer be sharpened, the backing plate must also become unusable. It is disadvantageous in particular then that when one wishes to sharpen the blade plate and the support plate together, an expensive combination hard metal grinding wheel must be used provided that the blade plate consists of hard metal as is usual.

SUMMARY OF THE INVENTION

The invention has the task of creating a milling head that does not have the disadvantages of these known milling heads.

By providing the backing plate with a toothed system on the front side, whose teeth nm in parallel to the longitudinal axis of the carrier body, and because the blade plate has a toothed system, which can be engaged with the toothed system on the front of the support plate, the support plate no longer needs to be shifted radially outward for reshapening the blade plate. Rather the blade plate must only be radially displaced to the outside by a tooth of micro-toothed system. This simplifies the regrinding on a constant flight circle diameter, because only the hard metal of the blade plate needs to be ground, which can be accomplished with a normal hard metal grinding wheel. The support plate only needs to be shaped when it is manufactured, which is possible with a normal corundum disk and can be accomplished quickly. Since the support plate does not need to be reground, it remains completely functional and can be used together with a new blade plate. In contrast to milling heads with soldered blades the solution in the invention has the advantage that very hard varieties of hard metal that cannot be soldered can be used. Furthermore, the danger of creating fractures when grinding and reshaping no longer exists as with soldered blades. Since a hard metal grinding wheel can be used for resharpening, a far higher quality of grinding on the back of the blade plate is possible to achieve than when grinding with a combination grind stone. In a preferred illustrative form, the support plates and the flank of the groove which creates the face of the support plate have a means for an interlocking securing device for the support plate against any dislocation in the radial direction relative to the carrier plate. In this way it is also prevented that a preferably provided toothed system of the support plate and the groove edge be misused to be able to radially displace the support plate to the outside by one or more teeth.

An interlocking securing device against an axial shifting of the blade plate relative to the backing plate is advantageous. It cannot lead then to a mispositioning of the blade plate in the axial direction due to inattention. Since its toothed system can engage with the toothed system of the support plate only within the radial adjustment range of the blade plate, a clearly obvious gap exists between the blade plate and the support plate when positioning the blade plate outside the radial adjustment range, which indicates to the user that the blade adjustment range has been exceeded. One can also provide an interlocking boundary of the radial displacement of the blade plate relative to the backing plate to avoid too large a radial displacement. It is especially advantageous when the backing plate has a pin overhanging its front side, which is engaged in a slot which extends at a right angle to the longitudinal extension of the teeth, because hereby an interlocking securing device against an axial shifting as well as against too large a radial displacement of the blade plate relative to the backing plate is achieved with very simply means.

BRIEF DESCRIPTION OF THE DRAWINGS

The invention is explained in detail with the help of two illustrative examples as shown in the drawings.

FIG. 1 shows a partially cut end view of an incompletely outfitted first illustrative example.

FIG. 2 shows an enlarged view from FIG. 1.

FIG. 7 shows an enlarged and incomplete side view of the blade plate of the second illustrative example.

FIG. 8 shows an enlarged and incomplete side view of the support plate of the second illustrative example.

FIG. 9 shows an excerpt from the top view of the second illustrative example.

DETAILED DESCRIPTION OF THE PREFERRED EMBODIMENT

Figure 3:
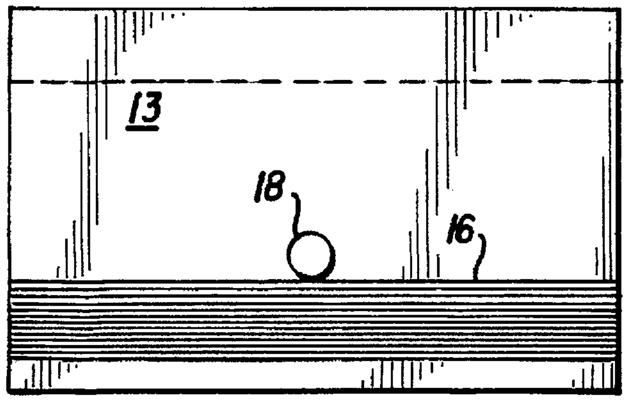
FIG. 3 shows a front view of the support plate of the first illustrative example.
Figure 4:
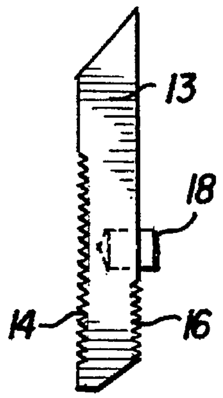
FIG. 4 shows an top view of the support plate of the first illustrative example.
Figure 5:
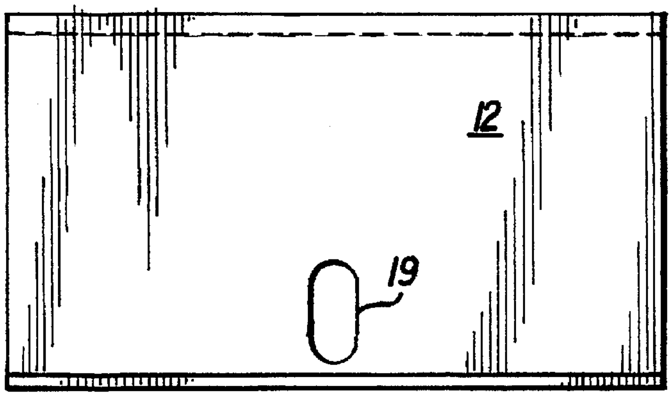
FIG. 5 shows a front view of the blade plate of the first illustrative example.
Figure 6:
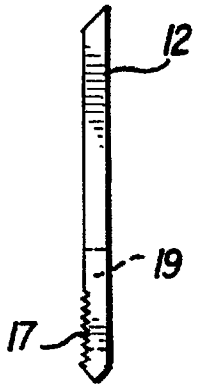
FIG. 6 shows an top view of the blade plate of the first illustrative example.

Referring now to the drawings, wherein like numerals represent like elements throughout the several views, in FIG. 1 there is shown a profile milling head for peripheral milling having a support body 1, which is provided with a central bore hole 2 through it for acceptance of a shaft. Four like recesses 3 penetrate from the outer surface area into the support body 1, which are evenly distributed over the perimeter and have the form of grooves which extend over the entire axial length of the support plate with an invariable shape.

As more clearly seen in FIGS. 1 and 2, these grooves have mutually parallel, even flanks that are inclined in the illustrative example against the radial plane, so that the outer rim advances against the inner rim. The flank 4 lagging in the rotational direction is provided with micro-toothed system 5 over nearly its entire surface, the teeth of which run parallel to the longitudinal axis of the support body. Between the inner end of these micro-toothed system 5 and the groove base 6, which rises from the lagging flank 4 to the leading flank 7 by a step, a penetrating, groove-type indentation 8 is provided in the lagging flank 4.

Several threaded bore holes 9, arranged at a distance from each other in the axial direction of the carrier plate 1, open into the leading flank 7, which open into the outer surface area of the support body 1 on the other side. The longitudinal axis of each of these threaded bore holes 9 creates with the lagging flank 4 a sharp angle pointing away from the groove base 6. In each threaded bore hole 9 a threaded pin 10 is arranged lying in it, the end piece of which is unthreaded and extends into the recess 3 in the illustrative example. The threaded pins 10 sit on the base of a triangular groove, which is provided in the side surface of a pressure block 11, which extends along the entire axial length of the support body 1. Except for this groove and a channel on the radial side on the outside for the chucking groove the pressure block 11 has a rectangular cross-section profile.

Between the side surface of the pressure block 11 the lagging flank 4 a blade plate 12 and a support plate 13 are arranged, which extend like the pressure block 11 over the entire axial length of the support plate 1. The support plate 13, which sits on the lagging flank 4, is provided with a micro-toothed system 14 on its back side, which engages in the micro-toothed system 5 of the lagging flank 4. The support plate 13 has a ridge-shaped section of material 15 overhanging the micro-toothed system 14 adjacent the inner end of the micro-toothed system 14, which engages in the indentation 8 and through that excludes a radial adjustment of the support plate 13 to the outside relative to the lagging flank 4.

The support plate 13 is provided with a micro-toothed system 16 on the lower end zone of its front side turned toward the leading flank 7, on which the back side of the blade plate 12 sits, the teeth of which run in the axial direction and extend along the entire axial length of the support plate 13. The micro-toothed system 16 juts out over the front side of the support plate 13, so that a micro-toothed system 17 can engage in it, which is provided in the lower half of the back side of the blade plate 12 and extends along the entire axial length. Since both micro-toothed systems 16 and 17 serve to be able to adjust the blade plate 12 radially to the outside tooth for tooth to be able to achieve the same flight circle diameter again as before when resharpening, the width of the zones with micro-toothed systems 16 and 17 is chosen according to the desired adjustment range.

To preclude an axial displacement of the blade plate 12 relative to the pressure plate 11 on the one hand and on the other hand to prevent the blade plate 12 from being able to be displaced to far to the outside relative to the support plate 13, a half-length taper-grooved dowel pin 18 extending over the front side is inserted in the support plate 13, which is securely engaged in an oblong slot and extends perpendicular to the longitudinal extension of the teeth of the micro-toothed systems 16 and 17.

As is shown in FIG. 1, the blade plate 12 and the support plate 13 are mounted together in the openings, while the pressure block 11 is pressed against the lagging flank 7 by means of the threaded pin 10. In this way the micro-toothed system 14 of the support plate 13 is held engaged with no movement with the micro-toothed system 5 of the lagging flank 4 as well as the micro-toothed system 17 of the support plate. Should a resharpening of the blade plate 12 be required, then the tension is released as far as is needed to displace the blade plate 12 radially by one tooth to the outside relative to the support plate 13. The blade plate is worked exclusively in the resulting resharpening. The support plate 13 is only shaped during its manufacturing process. It maintains, therefore, its original form and thus can be used together with a new or another blade plate 12, possibly of another material.

For the second illustrative example represented in FIG. 7 through 9, the blade plate 112 is provided with a toothed system 117 on its back side which corresponds with the toothed system 17 in the first illustrative example, the teeth of which extend over the entire axial extension of the blade plate 112. As in the first illustrative example, the toothed system 117 ends at a distance from the radial inner edge of the back side of the blade plate 112. Like the toothed system 17 in the first illustrative example, toothed system 117 is sunk completely in the back side of the blade plate 112, as FIG. 7 shows. Due to the small dimensions of the tooth shapes the toothed system 117 can also be described as micro-toothed system.

The toothed system 116 of the support plate 113, working together with the toothed system 117, as FIG. 8 shows, juts out over the front side of the support plate 113. The number of teeth in the toothed system 116 is smaller, in the illustrative example half as much, as the number of teeth in the toothed system 117. The blade plate 112 can then be adjusted by half the number of teeth of the toothed system 116 in the radial direction, shown in FIG. 9, which shows the blade plate 112 in the position on the inner end of the adjustment range.

If the user selects a position for the blade plate that is outside the adjustment range of the blade plate, at least one of the teeth of the toothed system 116 of the support plate comes into the arrangement on the back side of the blade plate 112. Should it be a matter of position in which the blade plate 112 is displaced over the adjustment range radially to the outside, at least one of the teeth of the toothed system 116 come into the arrangement in the region 120 of the back side of the blade plate between the toothed system 117 and the inner edge of the back side of the blade plate 112. The arrangement of the teeth of the toothed system 116 on the back side of the blade plate 112 results in a gap between the blade plate 112 and the support plate 113. This gap is clearly recognizable and indicates to the user that the blade plate 112 occupies an unacceptable position. Therefore an interlocking border of the adjustment range of the blade plate 112 in the radial direction is withdrawn in the second illustrative example, as it exists in the first illustrative example with the half length taper-groove dowel pin 18 and the oblong slot 19.

As in the first illustrative example the back side of the support plate 113 is provided with a toothed system 114 on its back side, which engages with the toothed system 105, with which the lagging flank 104 in the rotational direction of one of the grooves 103 is provided, which the carrier body 101 has.

Due to the remaining details, the first illustrative example is indicated for the illustration, since agreement with the first illustrative example exists in as far as this.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

I claim:

1. Milling head comprising a carrier body having a perimeter having recesses dispersed evenly around said perimeter in an axial direction of the carrier body for receiving a blade plate therein;

said blade plate being adjustable in a radial direction and being secured against axial shifting, by a support plate and a pressure block, wherein said pressure block presses said blade plate against said support plate;

said support plate including a toothed system having multiple parallel teeth extending longitudinally on a front side thereof;

said blade plate having corresponding teeth on a back side thereof, wherein said teeth in opposing relation can be brought together and engaged at a predetermined radial displacement of the blade plate relative to said support plate; and an interlocking securing device having an indentation having a groove shape and which prevents radial displacement of said support plate;

wherein said interlocking securing device comprises a toothed system on a back side of said support plate and corresponding teeth on one flank of the recess;

wherein a dowel pin is provided which prevents axial shifting of the blade plate relative to said support plate and defines a range of adjustment of said blade plate in a radial direction; and wherein said dowel pin extends over a front side of said blade plate and is secured in a slot in said blade plate, said slot being perpendicular to a longitudinal extension of the teeth of the toothed system of said blade plate.

2. A milling head comprising:

a carrier body having a longitudinal axis, an axial direction, a radial direction, a perimeter, and an outside, a blade plate having a front side and a back side, a support plate having a front side and a back side, a pressure block, means for interlockingly securing the support plate, wherein said carrier body includes a plurality of recesses distributed evenly around the perimeter, said recesses extending in the axial direction of the carrier body, grooves having a pair of flanks and which are open on the outside for receiving therein said blade plate adjustable in the radial direction, said blade plate secured against axial shifting on the front side of said supporting plate by means of said pressure block and at least one screw, said screw engaging a threaded bore hole in the carrier body, said bore hole penetrating one flank of the groove, said pressure block and said screw providing tensile support against the other flank of said groove, wherein the support plate includes a toothed system made of multiple parallel teeth running towards the longitudinal axis of the carrier body on the support plate front side, the blade plate is provided with a corresponding toothed system on the blade plate back side, wherein both toothed systems can be brought together and engaged with a selectable radial displacement of the blade plate relative to the support plate, wherein the means for interlockingly securing the support plate against displacement in the radial direction relative to the carrier body are provided by the flank which creates a support surface for the back side of the support plate, said flank provided with a toothed system that has teeth in parallel to the longitudinal axis of the carrier body, with a corresponding toothed system on the back side of the support plate which is engaged as said means for interlockingly securing of the support plate against a displacement in the radial direction relative to the carrier body, and wherein the flank between the inner end of its toothed system and the base of the recess has an indentation having a groove shape and extending in the direction of the teeth and the support plate in the junction on the inner end of its toothed system on the back side has a section of material engaged with the indentation;

wherein said interlocking securing device comprises a toothed system on a back side of said support plate and corresponding teeth on one flank of the recess;

wherein a dowel pin is provided which prevents axial shifting of the blade plate relative to said support plate and defines a range of adjustment of said blade plate in the radial direction; and wherein said dowel pin extends over the blade plate front side and is secured in a slot in said blade plate, said slot being perpendicular to the longitudinal extension of the teeth of the toothed system of said blade plate.

3. Milling head as recited in claim 2, wherein said toothed system of said blade plate ends at a distance from the radial inner edge of its back side.

4. Milling head as recited in claim 3, wherein said toothed system of the blade plate is wholly internal and the toothed system of said support plate projects outwardly past its non-tooth surface.

* * * * *